United States Patent
Lee et al.

(10) Patent No.: US 10,912,100 B2
(45) Date of Patent: Feb. 2, 2021

(54) METHOD FOR TRANSMITTING CONTROL INFORMATION FOR D2D COMMUNICATION IN WIRELESS COMMUNICATION SYSTEM AND DEVICE THEREFOR

(71) Applicant: LG ELECTRONICS INC., Seoul (KR)

(72) Inventors: Seungmin Lee, Seoul (KR); Hanbyul Seo, Seoul (KR); Byounghoon Kim, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 143 days.

(21) Appl. No.: 15/500,008

(22) PCT Filed: Jul. 29, 2015

(86) PCT No.: PCT/KR2015/007929
§ 371 (c)(1),
(2) Date: Jan. 27, 2017

(87) PCT Pub. No.: WO2016/018069
PCT Pub. Date: Feb. 4, 2016

(65) Prior Publication Data
US 2017/0280471 A1    Sep. 28, 2017

Related U.S. Application Data

(60) Provisional application No. 62/030,561, filed on Jul. 29, 2014.

(51) Int. Cl.
*H04W 72/04* (2009.01)
*H04W 72/12* (2009.01)
(Continued)

(52) U.S. Cl.
CPC ....... *H04W 72/12* (2013.01); *H04W 72/0406* (2013.01); *H04W 52/04* (2013.01); *H04W 52/383* (2013.01); *H04W 92/18* (2013.01)

(58) Field of Classification Search
CPC ... H04W 52/04; H04W 52/383; H04W 72/12; H04W 72/1278; H04W 72/0406; H04W 72/0473; H04W 92/18
See application file for complete search history.

(56) References Cited

U.S. PATENT DOCUMENTS

| 7,336,638 | B2 * | 2/2008 | Cheng | H04W 52/383 370/278 |
| 7,606,932 | B1 * | 10/2009 | Cypher | G06F 15/17337 370/470 |

(Continued)

OTHER PUBLICATIONS

PCT International Application No. PCT/KR2015/007929, Written Opinion of the International Searching Authority dated Nov. 6, 2015, 24 pages.

(Continued)

*Primary Examiner* — Huy D Vu
*Assistant Examiner* — Bailor C. Hsu
(74) *Attorney, Agent, or Firm* — Lee Hong Degerman Kang & Waimey

(57) ABSTRACT

The present invention relates to a method for transmitting control information for device-to-device (D2D) communication of a D2D transmission terminal in a wireless communication system, comprising the steps of: receiving a resource pool configuration for D2D communication; and mapping control information for a D2D reception terminal onto a resource pool related to a scheduling assignment, wherein the control information includes information for a D2D signal transmission of the D2D reception terminal to the D2D transmission terminal, and is unicast to the D2D reception terminal.

13 Claims, 10 Drawing Sheets

(51) Int. Cl.
*H04W 52/38* (2009.01)
*H04W 52/04* (2009.01)
*H04W 92/18* (2009.01)

(56) References Cited

U.S. PATENT DOCUMENTS

| | | | | |
|---|---|---|---|---|
| 9,014,062 | B2* | 4/2015 | Ahn | H04L 1/0003 370/280 |
| 9,107,202 | B2* | 8/2015 | Doppler | H04W 72/0406 |
| 9,253,802 | B2* | 2/2016 | Pelletier | H04W 74/002 |
| 9,521,675 | B2* | 12/2016 | Ge | H04W 4/70 |
| 9,622,132 | B2* | 4/2017 | Wang | H04W 36/165 |
| 9,826,522 | B2* | 11/2017 | Chen | H04W 72/00 |
| 9,974,066 | B2* | 5/2018 | Novlan | H04W 72/042 |
| 10,039,110 | B2* | 7/2018 | Lu | H04W 72/042 |
| 10,129,902 | B2* | 11/2018 | Kaur | H04W 56/002 |
| 2014/0334392 | A1* | 11/2014 | Gage | H04L 5/0092 370/329 |
| 2014/0355574 | A1* | 12/2014 | Turtinen | H04W 72/1278 370/336 |
| 2015/0056982 | A1* | 2/2015 | Sorrentino | H04W 60/00 455/426.1 |
| 2015/0085818 | A1* | 3/2015 | Huang | H04L 5/0037 370/330 |
| 2015/0156806 | A1* | 6/2015 | Pan | H04W 72/121 455/39 |
| 2015/0271861 | A1* | 9/2015 | Li | H04W 56/001 455/426.1 |
| 2015/0334735 | A1* | 11/2015 | Chang | H04W 4/70 370/329 |
| 2015/0358907 | A1* | 12/2015 | Berggren | H04W 52/0229 455/574 |
| 2015/0365840 | A1* | 12/2015 | Yang | H04L 5/0048 370/254 |
| 2016/0044619 | A1* | 2/2016 | Ryu | H04W 72/0446 370/350 |
| 2016/0112977 | A1* | 4/2016 | Byun | H04W 72/082 370/350 |
| 2016/0302215 | A1* | 10/2016 | Sorrentino | H04W 76/14 |
| 2016/0366661 | A1* | 12/2016 | Yoshizawa | H04L 5/14 |
| 2017/0079084 | A1* | 3/2017 | Matsumoto | H04W 76/14 |

OTHER PUBLICATIONS

Ericsson, "On scheduling assignments", R1-142400, 3GPP TSG RAN WG1 Meeting #77, May 2014, 2 pages.
Alcatel Lucent, "Resource allocation for scheduling assignment", R1-142574, 3GPP TSG RAN WG1 Meeting #77, May 2014, 6 pages.
Huawei, "Power control for D2D Signals", R1-141928, 3GPP TSG RAN WG1 Meeting #77, May 2014, 4 pages.
LG Electronics, "Control design for D2D broadcast communication", R1-142146, 3GPP TSG RAN WG1 Meeting #77, May 2014, 7 pages.
Fujitsu, "Further analysis on control signal and Scheduling Assignment for D2D communication", R1-141229, 3GPP TSG RAN WG1 Meeting #76bis, Apr. 2014, 7 pages.

* cited by examiner (a) Control-plane protocol stack (b) User-plane protocol stack (a)

(b)

METHOD FOR TRANSMITTING CONTROL INFORMATION FOR D2D COMMUNICATION IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/007929, filed on Jul. 29, 2015, which claims the benefit of U.S. Provisional Application No. 62/030,561, filed on Jul. 29, 2014, the contents of which are all hereby incorporated by reference herein in their entirety.

TECHNICAL FIELD

The present invention relates to a wireless communication system, and more particularly, to a method for transmitting control information for D2D (device-to-device) communication in a wireless communication system and device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The UE reports state information of a current channel to the eNB periodically and/or aperiodically to assist the eNB to efficiently manage the wireless communication system. Since the reported channel state information may include results calculated in consideration of various situations and accordingly, a more efficient reporting method is needed.

DISCLOSURE OF THE INVENTION

Technical Task

Based on the above-described discussion, a method for transmitting control information for D2D (device-to-device) communication in a wireless communication system and device therefor are proposed in the present invention.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In a first aspect of the present invention, provided is a method of transmitting control information for device-to-device (D2D) communication in a wireless communication system. The method, which is performed by a D2D transmission user equipment (UE), may include: receiving a resource pool configuration for the D2D communication; and mapping control information for a D2D reception UE to a resource pool associated with a scheduling assignment. In this case, the control information may include information for D2D signal transmission from the D2D reception UE to the D2D transmission UE and be unicasted to the D2D reception UE.

Additionally, when the D2D signal transmission is performed from the D2D reception UE to the D2D transmission UE, the control information may include information on radio resources that can be received by the D2D transmission UE.

Additionally, when the D2D signal transmission is performed from the D2D reception UE to the D2D transmission UE, the control information may include timing advance (TA) information to be applied to the D2D reception UE.

Additionally, when the D2D signal transmission is performed from the D2D reception UE to the D2D transmission UE, the control information may include information indicating D2D signal transmission power of the D2D reception UE.

In a second aspect of the present invention, provided is a method of receiving control information for device-to-device (D2D) communication in a wireless communication system. The method, which is performed by a D2D reception user equipment (UE), may include: receiving a resource pool configuration for the D2D communication; and receiving, from a D2D transmission UE, control information for the D2D reception UE in a resource pool associated with a scheduling assignment. In this case, the control information may include information for first D2D signal transmission to the D2D transmission UE and be unicasted from the D2D transmission UE.

Additionally, first radio resources for the first D2D signal transmission may be different from second radio resources indicated by the control information and the second radio resources may be radio resources for second D2D signal transmission from the D2D transmission UE to the D2D reception UE.

Additionally, when the first D2D signal transmission is performed, the control information may include timing advance (TA) information to be applied to the D2D reception UE.

Additionally, the TA information may be configured based on at least one TA field in the resource pool in an adaptive manner. Preferably, the TA information may include information of a granularity indication field (GIF) for indicating a per-unit variation value of TA. In addition, the control information may include information on a plurality of predefined scheduling assignment formats and the TA information may include an order indication field (OIF) for indicating a specific scheduling assignment format among the plurality of the scheduling assignment formats.

Additionally, the control information may include power control information for the first D2D signal transmission.

Additionally, the control information may include information indicating wake-up for second D2D signal transmission from the D2D transmission UE to the D2D reception UE.

Additionally, the control information may include information indicating channel state information (CSI) measurement at the D2D reception UE.

Additionally, the control information may further include information for second D2D signal transmission from the D2D transmission UE to the D2D reception UE.

In a third aspect of the present invention, provided is a device-to-device (D2D) transmission user equipment (UE) for transmitting control information for D2D communication in a wireless communication system. The D2D transmission UE may include a radio frequency unit and a processor. In this case, the processor may be configured to receive a resource pool configuration for the D2D communication and map control information for a D2D reception UE to a resource pool associated with a scheduling assignment. Further, the control information may include information for D2D signal transmission from the D2D reception UE to the D2D transmission UE and be unicasted to the D2D reception UE.

In a fourth aspect of the present invention, provided is a device-to-device (D2D) reception user equipment (UE) for receiving control information for D2D communication in a wireless communication system. The D2D reception UE may include a radio frequency unit and a processor. In this case, the processor may be configured to receive a resource pool configuration for the D2D communication and receive, from a D2D transmission UE, control information for the D2D reception UE in a resource pool associated with a scheduling assignment. Further, the control information may include information for first D2D signal transmission to the D2D transmission UE and be unicasted from the D2D transmission UE.

Advantageous Effects

According to embodiments of the present invention, control information for D2D communication can efficiently transmitted and received in a wireless communication system.

Effects obtainable from the present invention are non-limited by the above-mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

Figure 1:
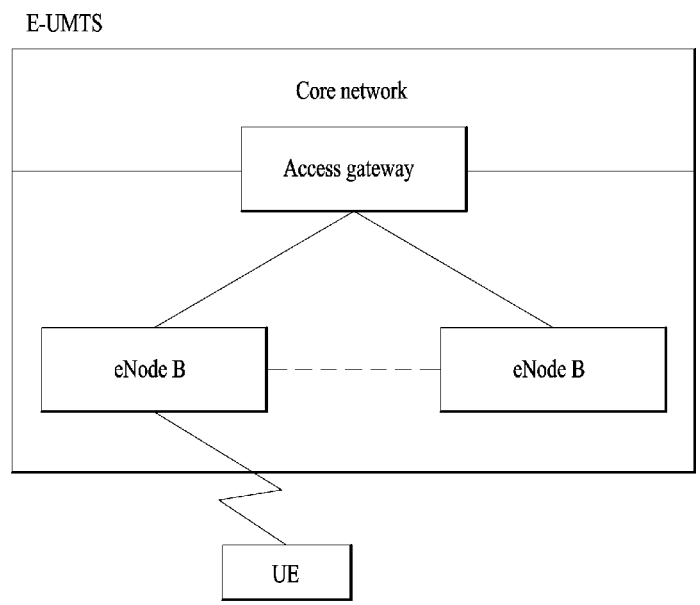
FIG. 1 is a schematic diagram of an E-UMTS network structure as one example of a wireless communication system.
Figure 2:
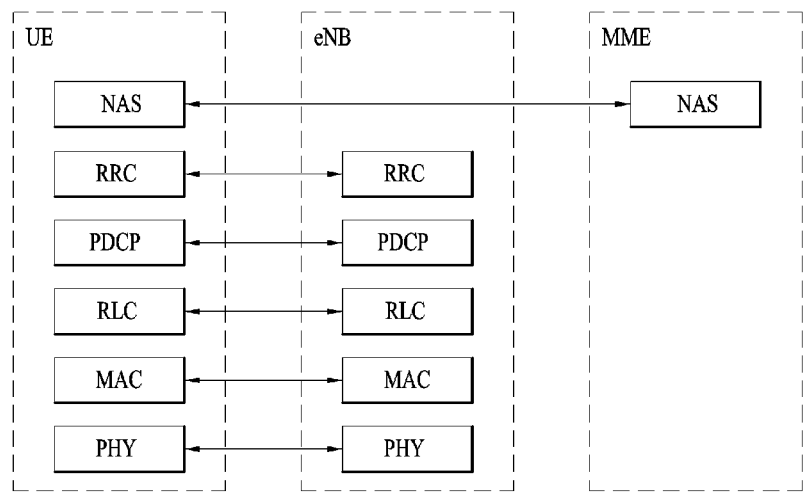
FIG. 2 illustrates structures of control and user planes of a radio interface protocol between a user equipment and E-UTRAN based on 3GPP radio access network standard.
Figure 2:
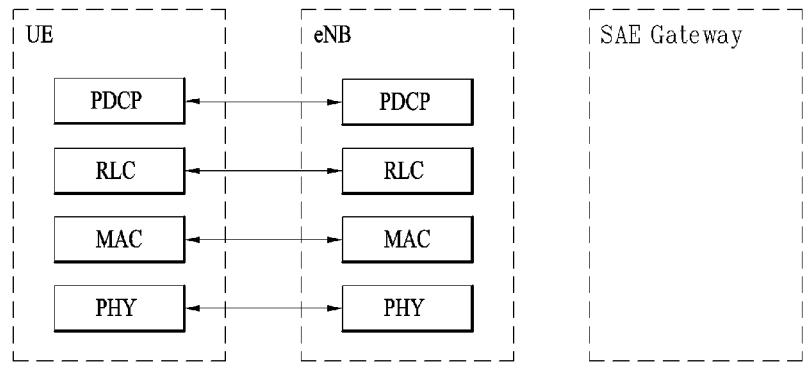

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
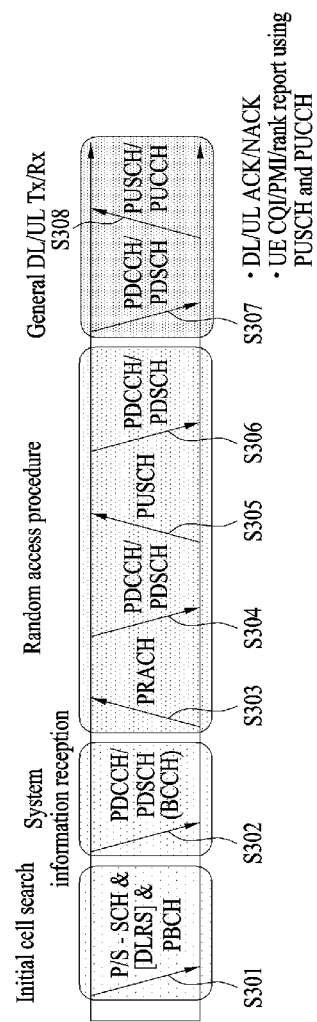
FIG. 3 illustrates physical channels used in a 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
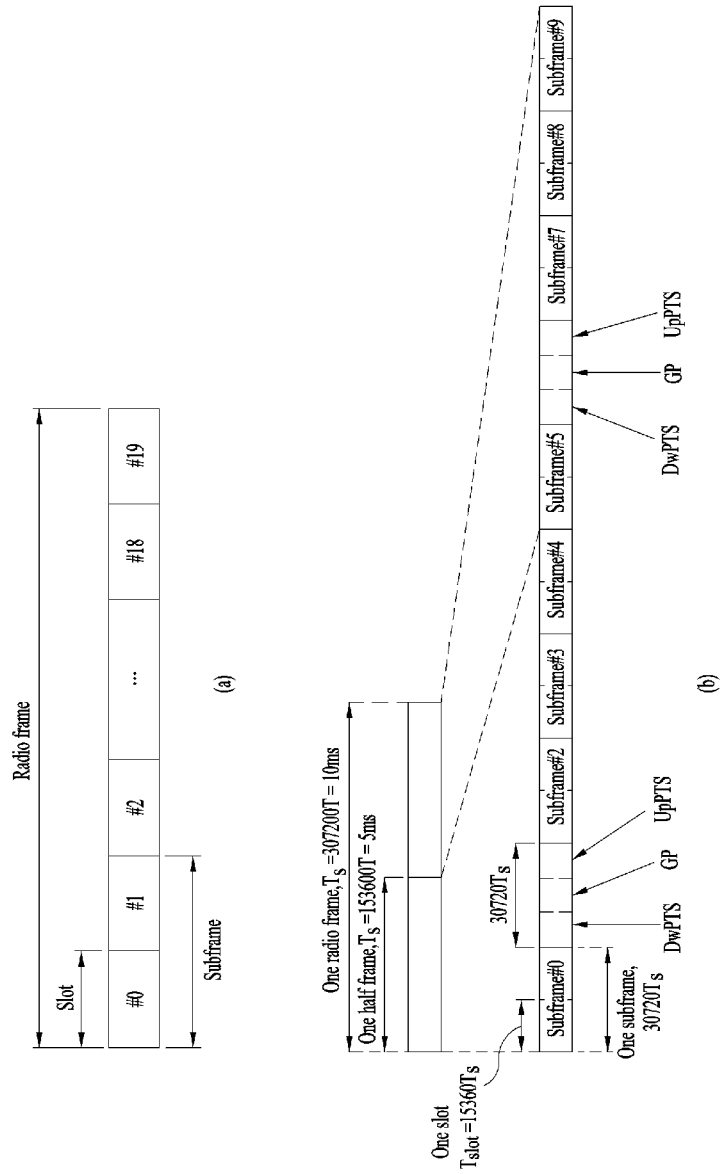
FIG. 4 illustrates a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | | Normal | Extended | | Normal cyclic | Extended cyclic |
| | DwPTS | cyclic prefix in uplink | cyclic prefix in uplink | DwPTS | prefix in uplink | prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
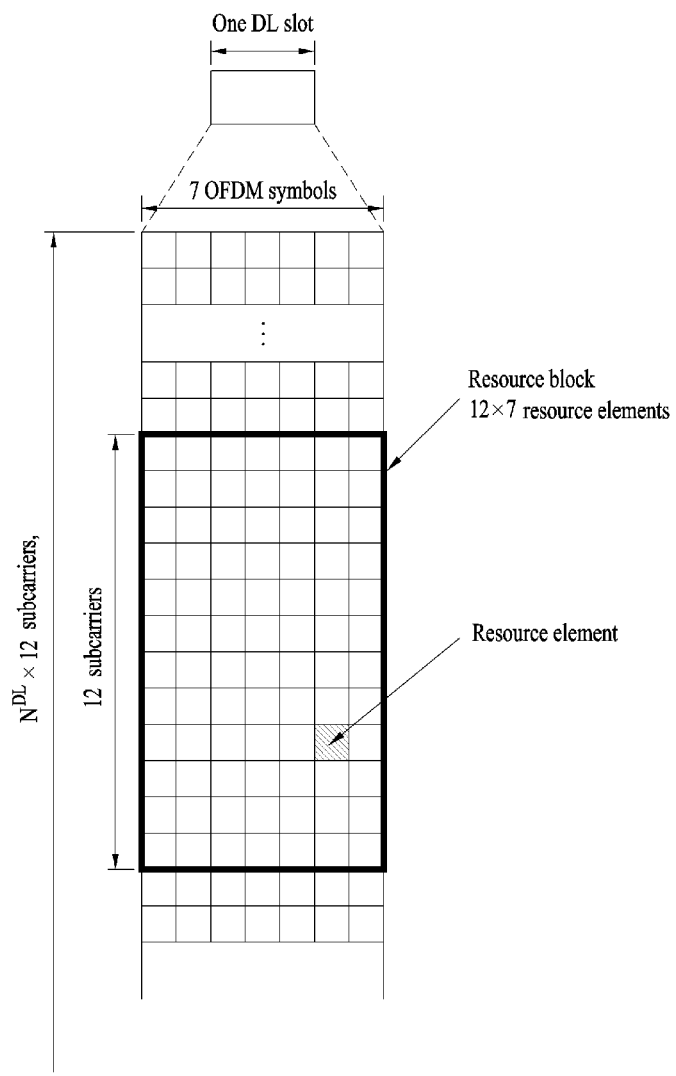
FIG. 5 illustrates a resource grid for a downlink slot.

FIG. 5 illustrates a resource grid for a downlink slot.

Referring to FIG. 5, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 6:
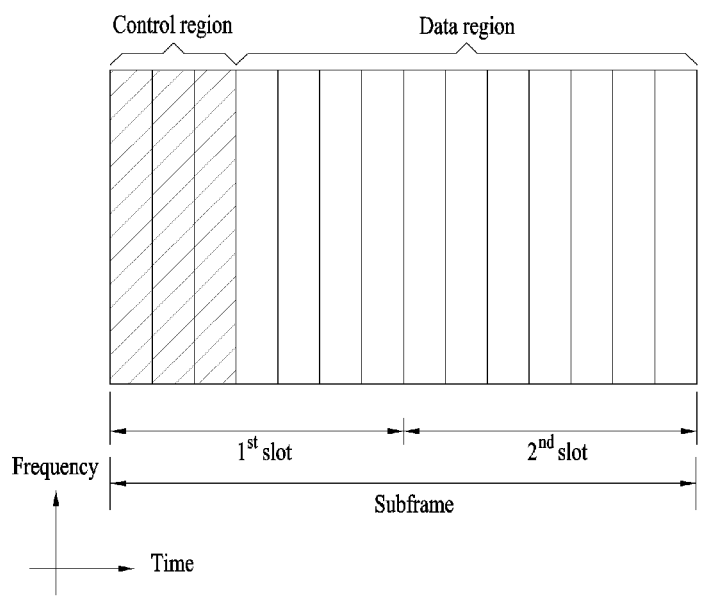
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
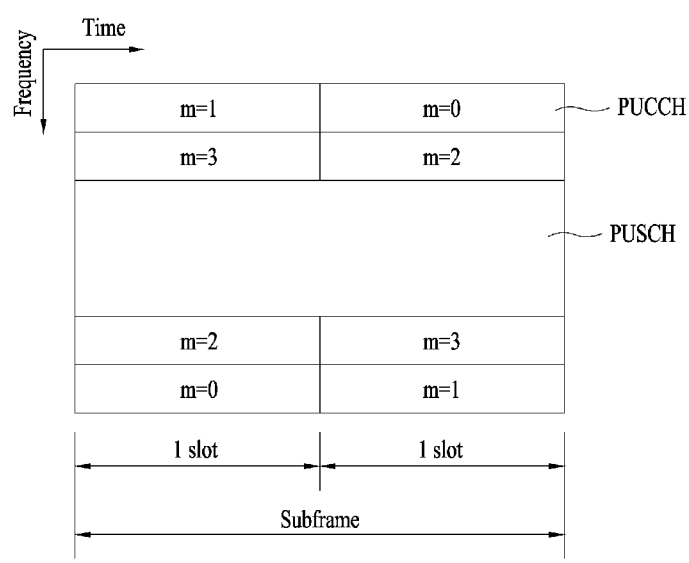
FIG. 7 illustrates a structure of an uplink subframe used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

D2D communication schemes can be mainly divided into a scheme supported by a network/coordination station (e.g., base station) and a scheme not supported by the network/coordination station.

Figure 8:
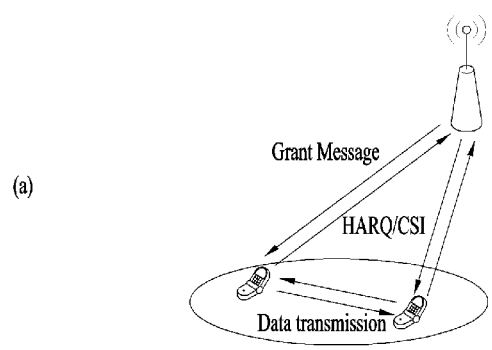
FIG. 8 is a reference diagram for explaining D2D (UE-to-UE) communication.
Figure 8:
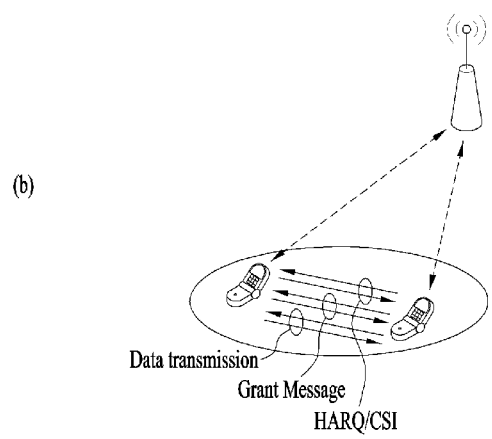

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8(b) illustrates a scheme in which the network provides minimum information (e.g., D2D connection information available in a corresponding cell) only but the user equipments that perform D2D communication establish links and transceive data.

Based on the above-mentioned discussion, the present invention proposes methods for enabling a UE that transmits a D2D signal (hereinafter referred to as "D2D TX UE") to efficiently transmit various types of control information to a UE that receives a D2D signal (hereinafter referred to as "D2D RX UE") when D2D (device-to-device) communication is performed. Here, the D2D communication means that a UE directly communicates with another UE through a radio channel. In addition, the present invention can be applied by considering that although the UE means a user's terminal, a network entity such as an eNB may also be regarded as the UE if the network entity transmits/receives signals according to a communication method between UEs.

For convenience of description, the present invention is described based on the 3GPP LTE system. However, the present invention can be extensively applied to other systems as well as the 3GPP LTE system.

Before describing particular embodiments of the present invention, D2D communication in the related art is described in brief. That is, according to the legacy (broadcasting-based) D2D communication, a D2D TX UE informs a D2D RX UE of control information on data to be transmitted later through SA (scheduling assignment) transmission before transmitting the data.

In particular, resource configuration/allocation when a UE directly communicates with another UE through a radio channel is described.

In general, when a UE directly communicates with another UE through a radio channel, the UE may select a resource unit (RU) corresponding to a specific resource in a resource pool corresponding to a set of resources and then transmit a D2D signal using the corresponding RU (D2D TX UE's operation). A D2D RX UE receives resource pool information, which can be used by the D2D TX UE for signal transmission, and then detects the signal from the D2D TX UE in the corresponding resource pool. In this case, the resource pool information may i) be indicated by a base station when the D2D TX UE is in coverage of the base station or ii) be indicated by another UE or determined as pre-configured resources when the D2D TX UE is out of the coverage of the base station.

In general, a resource pool includes a plurality of RUs. In addition, each UE may select one or more RUs to transmit its D2D signal.

Figure 9:
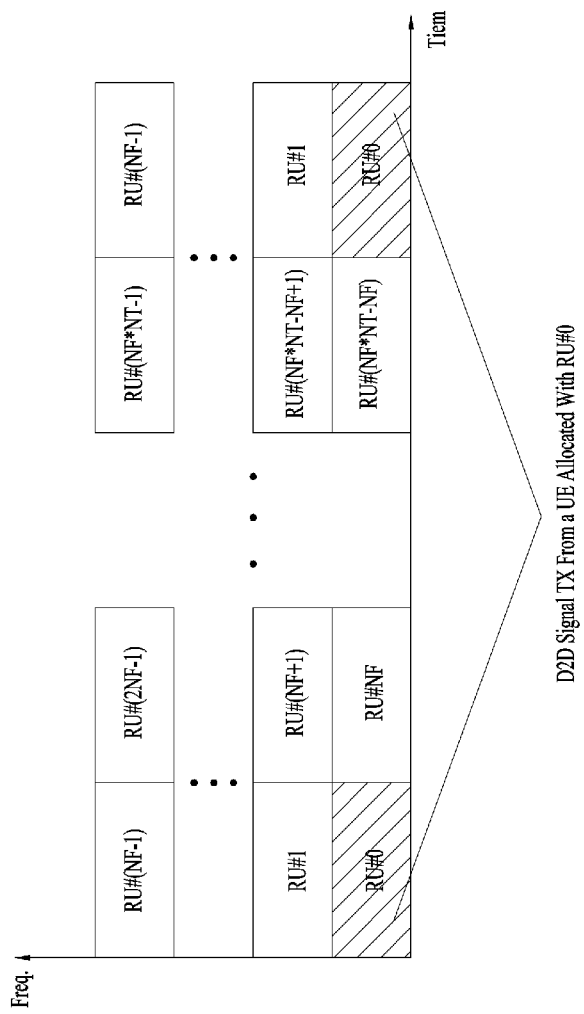
FIG. 9 illustrates a configuration of a resource unit (RU) for D2D communication according to the present invention.

FIG. 9 is a reference diagram for explaining an example of a resource unit (RU) configuration for D2D communication. All frequency resources are divided into NF resource units and all time resources are divided into NT resource units, thereby defining total (NF*NT) resource units. In this case, the resource pool is repeated with a period of NT subframes. As shown in FIG. 9, one specific resource unit may be repeated periodically. Alternatively, to obtain a diversity effect in a time dimension or a frequency dimension, an index of a physical RU to which a single logical RU is mapped may be changed according to a time based on a predetermined pattern. Considering such a resource unit structure, the resource pool may mean a set of resource units that can be used by a UE intending to transmit a D2D signal to transmit the D2D signal.

The aforementioned resource pool can be subdivided into several types. In particular, the resource pool may be classified according to a content of the D2D signal transmitted in each resource pool. For example, the content of the D2D signal can be classified as follows and a separate resource pool may be configured for each content.

Scheduling assignment (SA): The SA means a signal containing information such as a location of resources used by each D2D TX UE for transmitting a follow-up D2D data channel, MCS (modulation and coding scheme) necessary for demodulation of other data channels, or a MIMO transmission scheme. In addition, this signal may be multiplexed and transmitted with D2D data on the same resource unit. In this case, an SA resource pool may mean a resource pool in which the SA is multiplexed and transmitted with the D2D data.

D2D data channel: The D2D data channel may mean a resource pool used by the D2D TX UE for transmitting user data by utilizing the resources designated through the SA. In case the D2D data channel is multiplexed and transmitted with SA information on the same resource unit, only the D2D data channel except the SA information may be transmitted in the resource pool for the D2D data channel. In other words, resource elements (REs) used for transmitting the SA information on each resource unit in the SA resource pool may be used for transmitting the D2D data on the D2D data channel resource pool.

Discovery message: A discovery message resource pool may mean a resource pool for transmitting the discovery message. The D2D TX UE may transmit the discovery message containing information such as its ID for the purpose of enabling neighboring UEs to discover the corresponding D2D TX UE.

As described above, the D2D resource pool may be classified according to the content of the D2D signal. However, although D2D signals have the same content, different resource pools may be used according to transmitting/receiving properties of the D2D signals. For instance, even in the case of the same D2D data channel or discovery message, different resource pools may be used according to i) a scheme for determining a transmission timing of a D2D signal (e.g., a scheme for transmitting a D2D signal at a reception time of a synchronization reference signal or a scheme for transmitting a D2D signal at a time obtained by applying timing advance to a reception time of a synchronization reference signal), ii) a scheme for allocating a resource (e.g., a scheme in which an eNB designates a resource for transmitting each signal for each D2D TX UE or a scheme in which each D2D TX UE autonomously selects a resource for transmitting each signal from its pool), or iii) a signal format (e.g., the number of symbols occupied by each D2D signal in a single subframe or the number of subframes used for transmitting a single D2D signal).

In addition, a resource allocation method for D2D data channel transmission can be divided into the following two modes.

Mode 1: In mode 1, an eNB directly designates a resource for transmitting SA and D2D data for each D2D TX UE. As a result, the eNB can accurately grasp which UE uses which resource for D2D signal transmission. However, if the eNB designates a D2D resource for every D2D signal, it may cause significant signaling overhead. Hence, the eNB may allocate a plurality of SA transmission resources and/or data transmission resources through one-time signaling.

Mode 2: In mode 2, each D2D TX UE selects an appropriate resource from a series of resource pools associated with SA and data, which are configured by an eNB for a plurality of D2D TX UEs, and then transmits SA and data. As a result, the eNB cannot accurately grasp which UE uses which resource for D2D signal transmission.

Figure 10:
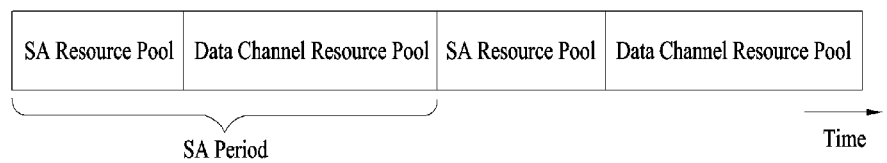
FIG. 10 illustrates a case in which a scheduling assignment (SA) resource pool and a follow-up data channel resource pool periodically appear.

FIG. 10 is a reference diagram for explaining a case in which a scheduling assignment (SA) resource pool and a follow-up data channel resource pool periodically appear.

Referring to FIG. 10, the SA resource pool precedes a resource pool containing a series of D2D data channels. First, a D2D RX UE attempts SA detection. Thereafter, if discovering data that the D2D RX UE needs to receive, the D2D RX UE attempts to receive the data on interconnected data resources. Thus, the SA resource pool and the follow-up data channel resource pool may periodically appear as shown in FIG. 10. For convenience of description, a period in which the SA resource pool appears again is hereinafter defined as an SA period.

However, for instance, when D2D communication is extended in the form of unicast, the D2D TX UE needs to transmit not only control information on data to be transmitted but also various types of control information to the D2D RX UE. In this case, the various types of the control information may be transmitted through the conventional SA format (e.g., application of convolution code) or a format modified therefrom by considering backward compatibility with signals and procedures associated with the legacy (broadcasting-based) D2D communication. In addition, such a purpose of the conventional SA format or format modified therefrom may be independently transmitted without the follow-up data transmission. Such a scheme is similar to a (unicast form of) PDCCH in that the PDCCH is transmitted as the convolution code and blind decoded by a UE in consideration of decoding complexity and multiplexing capacity.

For convenience of description, a UE that transmits the conventional SA format or format modified therefrom according to the present invention is defined as "SA TX UE" and a UE that receives the corresponding signal is defined as "SA RX UE". In this case, the SA TX UE and the SA RX UE can be interpreted as the D2D TX UE and the D2D RX UE, respectively.

Figure 11:
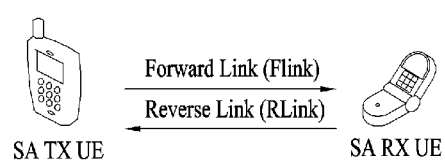
FIG. 11 illustrates a link as an example to which the present invention can be applied.

FIG. 11 is a reference diagram for explaining a link as an example to which the present invention can be applied. As shown in FIG. 11, in the present invention, a link from an SA TX UE to an SA RX UE is defined as "Forward Link (FLink)" and a link from an SA RX UE to an SA TX UE is defined as "Reverse Link (RLink)".

In the present invention, examples of various control information, which can be transmitted from a D2D TX UE (i.e., SA TX UE) to a D2D RX UE (i.e., SA RX UE), are explained with reference to control information associated with communication in an RLink direction, control information associated with communication in an FLink direction and control information associated with communication in FLink and RLink directions. As described above, the various control information may be transmitted through the conventional SA format or format modified therefrom by considering backward compatibility with signals/procedures in the legacy (broadcasting-related) D2D communication. Further, such a purpose of the conventional SA format or format modified therefrom may be independently transmitted without the follow-up data transmission (i.e., SA only transmission).

In addition, the embodiments of the present invention can be implemented in the form of other predefined signals (e.g., D2D data channel, a new channel defined for the corresponding purpose, etc.) besides the conventional SA format or format modified therefrom. Moreover, the embodiments of the present invention can be applied for the purpose of allowing an SA TX UE to inform an SA RX UE of various control information associated with data, which will be transmitted by the SA RX UE to another D2D UE (except data to be transmitted to the SA TX UE).

Furthermore, in the embodiments of the present invention, the SA TX UE (or the SA RX UE) may be configured to simultaneously transmit a plurality of (previously defined or signaled) SA formats/modified SA formats/other predefined signals/other predefined formats, each including control information related with communication in the RLink direction and/or FLink direction.

Control Information Associated with Communication in Reverse Link (RLink) Direction Usage 1: According to the present invention, resource allocation information associated with the communication in the RLink direction can be transmitted. In this case, the resource allocation information associated with usage 1 may indicate location information of resources that will be used by the SA TX UE for transmitting data to the SA RX UE in the RLink direction. Alternatively, the resource allocation information associated with usage 1 may inform the SA RX UE of location information of resources that are possible to be received (or where it is expected that reception operation is performed) in the RLink direction from the perspective of the SA TX UE.

In addition, the resource allocation information associated with the usage 1 may be configured such that the SA RX UE is informed only indices (e.g., time resource pattern of transmission, (T-RPT)) of time resources (e.g., SFs) where the reception operation will be performed (or where it is expected that the reception operation is performed) by the SA TX UE. In this case, a field/bit for indicating frequency resource location information in the (conventional) SA format may be unnecessary. In addition, such an extra field/bit may be configured to be used (merged) to inform the time resources where the reception operation will be performed (or where it is expected that the reception operation is performed) by the SA TX UE (i.e., it is possible to increase the number of T-RPT candidates).

Moreover, by defining an additional field (e.g., 1-bit tag field) on the (conventional) SA format, it is possible to distinguish whether time resource location information and/or frequency resource location information of the SA format with the additional field configured therein is resource allocation information for data transmission in the RLink direction or resource allocation information for data transmission in the FLink direction.

Furthermore, the resource allocation information may be signaled in a dedicated manner. That is, the resource allocation information may be informed a specific UE through a designated specific resource. Alternatively, the resource allocation information may be signaled in a broadcasting manner. That is, information on an RLink resource pool may be informed a plurality of unspecified UEs (or a UE group) (e.g., the SA TX UE may signal (e.g., T-RPT) a subset of a D2D TX/RX resource pool, which is signaled from an eNB (or a specific D2D UE) or previously defined, as its reception-available resource pool).

Further, according to the present invention, in case D2D operation is performed on an unlicensed band, if the SA TX UE determines that a channel is idle due to no transmission from neighboring devices, the SA TX UE may designate RLink resources through the aforementioned SA transmission and then the SA RX UE may transmit data using the corresponding resources.

Usage 2: According to the present invention, an indicator for triggering transmission of TA (timing advance) information associated with the communication in the RLink direction can be transmitted. In this case, the corresponding indicator may be used by the SA TX UE to (re)transmit, to the SA RX UE, TA information associated with D2D signal reception in the RLink direction. The transmission of the indicator associated with the usage 2 may be interpreted as that since it is determined (from the perspective of the SA TX UE) that RLink-related time synchronization is inaccurate, the SA RX UE is requested to (re)adjust/update (current) RLink-related TA information.

Usage 3: According to the present invention, TPC (transmission power control) information associated with D2D signal transmission in the RLink direction can be transmitted. The corresponding information associated with usage 3 may be transmitted through a TPC field defined in the SA format and the corresponding TPC field may carry an offset value for (current) D2D signal transmission power in the (previously determined or signaled) RLink direction. The above-mentioned operation associated with the usage 3 may be performed according to an absolute power control method (or an accumulated power control method). Moreover, the corresponding TPC field may also be used to indicate increase/decrease (e.g., up/down) in the (current) D2D signal transmission power in the (previously determined or signaled) RLink direction.

As another example, a plurality of (previously defined or signaled) TPC fields may be defined in a single SA format (e.g., similar to DCI format 3/3A). For instance, a TPC field may be interconnected to previously defined or signaled specific RLink and carry control information for (current) D2D signal transmission power in a direction toward the corresponding specific RLink. In other words, when a plurality of TPC field is defined in a single SA format, the single SA format may be configured to carry power control information associated with a plurality of RLinks.

Control Information Associated with Communication in Forward Link (FLink) Direction Usage 4: According to the present invention, resource allocation information associated with the communication in the FLink direction can be transmitted. In this case, the corresponding resource allocation information may indicate location information of resources that will be used by the SA TX UE for transmitting data to the SA RX UE in the FLink direction. Alternatively, the corresponding resource allocation information may indicate the SA RX UE that only data in the RLink direction transmitted on the remaining resources except the corresponding resources can be received due to HD (half duplex) restriction.

In this case, as an example of indicating that only the data in the RLink direction transmitted on the remaining resources except the corresponding resources can be received due to the HD restriction, the corresponding resource allocation information may inform the SA RX UE of an index (e.g., T-RPT) of a time resource where transmission operation will be performed (or where it is expected that the transmission operation is performed) by the SA TX UE. After receiving such information, the SA RX UE may use the remaining time resources as much as possible except the time resources where the SA TX UE performs the transmission operation when transmitting D2D data to the SA TX UE. Thus, the SA TX UE can receive data on resources as much as possible.

Specifically, if some of resources that are determined by the SA RX UE to be used for D2D data transmission is included in transmission resources of the SA TX UE, it is possible to skip D2D data transmission on the corresponding resources. The reason for this is to reduce interference caused by unnecessary transmission because the SA TX UE may not perform reception operation on the corresponding resources. Thus, in this case, the field/bit for indicating frequency resource location information in the (conventional) SA format may be unnecessary. In addition, such an extra field/bit may be configured to be used (merged) to inform the time resources where the transmission operation will be performed (or where it is expected that the transmission operation is performed) by the SA TX UE (i.e., it is possible to increase the number of T-RPT candidates).

Furthermore, the resource allocation information may be signaled in a dedicated manner. That is, the resource allocation information may be informed a specific UE through a designated specific resource. Alternatively, the resource allocation information may be signaled in a broadcasting manner. That is, information on an FLink resource pool may be informed a plurality of unspecified UEs (or a UE group) (e.g., the SA TX UE may signal (e.g., T-RPT) a subset of a D2D TX/RX resource pool, which is signaled from an eNB (or a specific D2D UE) or previously defined, as a resource pool where its (SA TX UE's) transmission operation in the FLink direction is performed).

Usage 5: According to the present invention, TA (timing advance) information associated with the communication in the FLink direction can be transmitted. For instance, TA information associated with usage 5 may be used by the SA TX UE to inform the SA RX UE of TA information associated with D2D signal reception in the FLink direction.

In this case, transmission of the TA information associated with the usage 5 can be performed according to 5-A to 5-C. In addition, such a signal may indicate that the SA TX UE updates the TA information associated with the D2D signal reception in the FLink direction (or an SA applied to the FLink). Moreover, the following 5-A to 5-C can be extensively applied to transmission of TA information associated with D2D signal reception in the RLink direction (e.g., the aforementioned control information associated with the usage 2).

5-A: If the SA TX UE transmits an SA format in which a TA information related field (e.g., T bits) is defined several times (as many as a previously defined or signaled number of times), the TA information associated with the D2D signal reception in the FLink direction may be configured in a relatively accurate manner (i.e., it may be interpreted as gradual adjustment).

As an example of the above case, if the SA format having the TA field defined therein is transmitted N times (e.g., "transmission of a first SA format including TA1 information, transmission of a second SA format including TA2 information, . . . , and transmission of an $N^{th}$ SA formation including TAN information"), the SA RX UE may assume that a value of "TA1+TA2+ . . . +TAN" is a final TA for the D2D signal reception in the FLink direction.

In this case, although N times of the SA format transmission may be performed on a single identical (SA TX/RX) resource pool, it may be defined/configured that the SA format transmission is performed on a plurality of (SA TX/RX) resource pools. For instance, if SA formats are transmitted in a plurality of resource pools, it may mitigate a problem caused by HD (half duplex) characteristics, i.e., a case in which the SA RX UE fails to receive the corresponding (some or all of N) SA formats due to transmission of a D2D signal (e.g., discovery message, D2D data channel, SA, etc.).

5-B: In the SA format described in 5-A, a granularity indicator field (hereinafter abbreviated as GIF) associated with TA information may be defined. In this case, the GIF indicates an increase/decrease interval of a TA value indicated by a TA field. As a particular example, if a TA field is set to '0000010' and a GIF indicates a K value, the SA RX UE may assume that a value of "a previously defined or signaled reference value (e.g., 0)+2*K value" is the final TA for the D2D signal reception in the FLink direction.

In this case, it can be defined that a value indicated by a specific bit of the GIF may be i) signaled from an eNB, ii) fixed to a specific value in the specification, or iii) determined as a value interconnected to a resource pool associated with D2D signal transmission/reception.

As another example, the GIF may indicate at least (some or all) different values in each SA format transmission. Specifically, in the N times of the SA format transmission, the GIF may represent a relatively large value (i.e., coarse TA adjustment) in preceding M times of the SA format transmission. On the contrary, in the following (N-M) times of the SA format transmission, the GIF may represent a relatively small value (i.e., fine TA adjustment). The purpose of the above method is to configure a relatively accurate TA value within the N times of the SA format transmission.

As a further example, instead of defining the aforementioned GIF, a TA field may have at least (some or all) different sizes in each SA format transmission to configure the relatively accurate TA value. Specifically, in the N times of the SA format transmission, TA field sizes may be set to be relatively small in preceding M times of the SA format transmission. On the contrary, in the following (N-M) times of the SA format transmission, TA field sizes may be set to be relatively large. For instance, the small TA field sizes (e.g., S bits) may be interpreted as that a predefined range of TA values (i.e., "from TA_MIN to TA_MAX") is divided into a relatively small numeral (e.g., $2^S$) (i.e., coarse TA adjustment). On the other hand, the large TA field sizes (e.g., L bits (L>S)) may be interpreted as that the predefined range of TA values is divided into a relatively large numeral (e.g., $2^L$) (i.e., fine TA adjustment).

As another particular example, although the same (previously defined or signaled) timing advance granularity value is assumed in the N times of the SA formation transmission, the TA field may have at least (some or all) different sizes in each SA format transmission. In case of a small TA field size, since the number of TA values (candidates) that can be indicated by the corresponding field is decreased, it is possible to apply coarse TA adjustment operation. On the other hand, in case of a large TA field size, since the number of TA values (candidates) that can be indicated by the corresponding field is increased, it is possible to apply fine TA adjustment operation.

Further, instead of defining the GIF or changing the TA field sizes, it may be configured that at least (some or all) different timing advance granularity values, which are previously defined or signaled, are applied according to an order of the SA format transmission.

5-C: In the SA format described in 5-A, an order indication field (hereinafter abbreviated as OIF) indicating how many SA formats are transmitted before an SA format transmitted at a specific time among the previously defined or signaled N SA formats may be defined. If the SA RX UE recognizes that it fails to receive at least one of the N SA formats, the SA RX UE may be configured to i) inform the SA TX UE of the failure through a predefined signal (for example, after receiving the corresponding feedback signal, the SA TX UE may retransmit TA information associated with the SA format which the SA RX UE fails to receive), ii) apply a specific final TA value which is previously defined or signaled, or iii) assume TA information associated with the SA format which the SA RX UE fails to receive to be a previously defined or signaled specific value.

As another example, instead of defining the OIF separately, how many SA formats are transmitted before the SA format transmitted at the specific time among the previously defined or signaled N SA formats may be grasped based on locations of time and/or frequency resources where the corresponding SA format is transmitted or resource types (e.g., CS (cyclic shift), OCC (orthogonal cover code), antenna port, etc.) of a reference signal (e.g., DM-RS) used for transmitting/decoding the corresponding SA format.

Usage 6: According to the present invention, TPC (transmission power control) information associated with D2D signal transmission in the FLink direction can be transmitted. In this case, the corresponding information associated with usage 6 may be transmitted through a TPC field defined in the SA format and the corresponding TPC field may carry an offset value for (current) D2D signal transmission power in the (previously determined or signaled) FLink direction. The above-mentioned operation associated with the usage 6 may be performed according to an absolute power control method (or an accumulated power control method).

Moreover, a plurality of (previously defined or signaled) TPC fields may be defined in a single SA format (e.g., similar to DCI format 3/3A). For instance, a TPC field may be interconnected to previously defined or signaled specific FLink and carry control information for (current) D2D signal transmission power in a direction toward the corresponding specific FLink. In other words, when a plurality of TPC field is defined in a single SA format, the single SA format may be configured to carry power control information associated with a plurality of FLinks.

Usage 7: According to the present invention, WAKE UP indication information for the D2D signal reception in the FLink direction can be transmitted. The corresponding indication information associated with usage 7 may be used by the SA TX UE to enable its target UE (or the SA RX UE)

to perform the D2D signal reception in the FLink direction by waking up the target UE. This information may be used for the purpose of paging associated with D2D communication.

In addition, control information associated with the usage 7 can be extensively applied to a case in which the SA RX UE enables its target UE (or the SA TX UE) to perform the D2D signal reception in the RLink direction by waking up the target UE.

Usage 8: According to the present invention, an indicator for triggering CSI measurement operation and/or CSI reporting operation can be transmitted. The corresponding indicator associated with usage 8 may be used by the SA TX UE to instruct its target UE (or the SA RX UE) to perform the CSI measurement operation and/or the CSI reporting operation with respect to links between the corresponding UEs.

For instance, it may be configured that the corresponding CSI measurement operation is performed based on DM-RSs used in SA transmission/decoding. The measured CSI may be transmitted through the RLink using an RPT (resource pattern of transmission) indicated by the corresponding SA. In addition, such a scheme associated with the usage 8 may be extensively applied to the RLink direction (e.g., transmission from the SA RX UE to its target UE (or the SA TX UE)).

Usage 9: According to the present invention, in the control information associated with the communication in the FLink direction, extra information that is not described in the usage 4 to the usage 8, for example, information indicated through a PDCCH (e.g., DM-RS CS, NDI, MCS/RV, FH, HARQ ID, PMI, etc.) may be configured to be informed.

Control Information Associated with Communication in Forward Link (FLink) and Reverse Link (RLink) Directions Usage 10: According to the present invention, resource allocation information associated with communication in the FLink and RLink directions can be simultaneously transmitted. In this case, the resource allocation information associated with the usage 10 may be configured such that resource allocation information associated with data transmission in the FLink direction and the RLink direction is simultaneously informed through one time of SA format (modified SA format or different predefined signal/format) transmission as unicast operation.

For instance, it may be configured that among time resources (e.g., T-RPT) designated by SA, odd-numbered resources are used for D2D signal transmission in the FLink direction and even-numbered resources are used for D2D signal transmission in the RLink direction based on a predefined configuration/signaling.

As another example, transmission of control information (or resource allocation information) associated with the usage 10 may be performed such a manner that the SA TX UE simultaneously performs transmission of an SA format (or modified SA format/different predefined signal/different predefined format) associated with control information in the FLink direction and transmission of an SA format (or modified SA format/different predefined signal/different predefined format) (which are different from transmission based on a single SA format/modified SA format/different predefined signal/different predefined format).

Further, to distinguish between the SA format or format modified therefrom described in the present invention and the conventional (FLink-related) SA format, the following methods 1 to 3 according to the present invention can be applied.

Method 1: Unlike the conventional FLink-related SA format, the SA format or format modified therefrom described in the present invention may be configured such that i) CRC masking/decoding is performed thereon based on a new UE ID (identifier) that is previously signaled or defined (or an (physical layer or virtual) ID generated from a UE ID) or ii) scrambling/base sequence group hopping/sequence hopping is performed thereon based on a previously signaled or defined cell ID.

Method 2: Unlike the configuration of the conventional FLink-related SA format, in the SA format or format modified therefrom described in the present invention, a field associated with transmission of SA TX UE's ID information may defined i) with or ii) without a field associated with transmission of SA RX UE's ID information. In addition, to distinguish the SA format or format modified therefrom according to the present invention from the conventional SA format, an indicator field for indicating the SA format or format modified therefrom according to the present invention may be defined therein (e.g., it is valid when CRC masking/decoding is performed according to i) the same UE ID as that of the conventional SA format or ii) an (physical layer or virtual) ID generated from the same UE ID).

Moreover, in the SA format or format modified therefrom described in the present invention, a field for indicating usage (e.g., "(usage #1) to (usage #10)") of a corresponding signal may be defined or an indicator indicating the usage of the corresponding signal may be included.

Method 3: A resource pool in which the SA format or format modified therefrom described in the present invention is transmitted (hereinafter named "new SA resource pool (NAS RP)") and a resource pool in which the conventional SA format is transmitted (hereinafter named "original SA resource pool (OSA RP)") may be configured independently (e.g., at least parts (i.e., some or all) of them are different from the another)

For instance, the NAS RP may be configured to precede the OSA RP (in the time domain) or periodically appear at a (previously defined or signaled) independent period. In this case, if the SA RX UE intends to perform D2D signal transmission operation (that is, a case in which the SA TX UE is a target UE) in the RLink direction, the SA RX UE may be configured to preferentially perform search/blind detection for/of the SA format or format modified therefrom described in the present invention, which is transmitted by the SA TX UE in the NSA RP.

Each of the aforementioned embodiments/configurations/rules of the present invention can be interpreted/applied/implemented as an independent embodiment. And, it is possible to implement each of the aforementioned embodiments not only independently but also by combining (or merging) at least one of the embodiments.

In addition, in this specification, the term such as "D2D (device-to-device) communication" can be interpreted as "V2X (vehicle-to-X) communication". Here, for example, "X" may be interpreted as a vehicle (i.e., V2V), a person (i.e., V2P), an infra-structure (i.e., V2I), or the like Moreover, the embodiments of the present invention may be configured to be limitedly applied only to Mode 1 D2D communication or Mode 2 D2D communication.

Furthermore, the aforementioned embodiments of the present invention may be configured to be limitedly applied only to D2D communication operation and/or D2D discovery operation. Further, the aforementioned embodiments of the present invention may be configured to be limitedly applied only to V2X communication.

Further, the aforementioned embodiments of the present invention may be configured to be limitedly applied only to D2D communication or only when D2D discovery is performed.

Further, the aforementioned embodiment (e.g., SA only transmission) of the present invention can be extensively applied to i) a case in which when D2D communication is performed in an unlicensed band, a D2D RX UE informs a D2D TX UE of a carrier sensing result performed on the unlicensed band (e.g., BUSY/IDLE) or ii) a case in which resource allocation/control information associated with data transmission in the FLink direction is informed.

Further, the embodiments of the present invention can be extensively applied when an HTX (heavy transmission) D2D UE (e.g., D2D relay UE (D2D RUE), D2D group owner UE (D2D GOUE), Independent synchronization source (ISSS), etc.) shares location information of resources that are possible to be received (or where it is expected that reception operation is performed).

Further, in the method 3, the NAS RP in which the SA format or format modified therefrom according to the method 3 is transmitted and the OSA RP in which the conventional SA format is transmitted may be defined as the same resource pool. In other words, the SA format or format modified therefrom according to the method 3 may be transmitted by being multiplexed with the conventional SA format (or D2D data channel) in the same resource pool.

Figure 12:
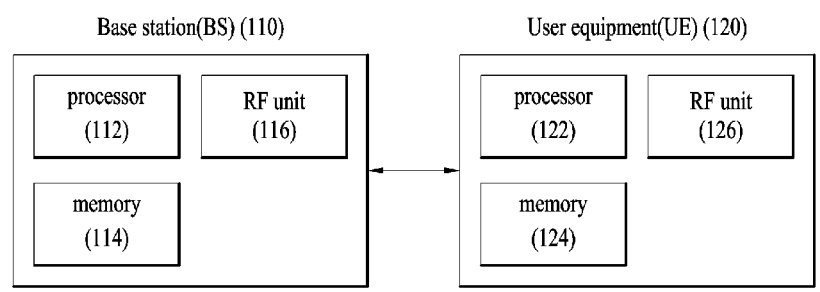
FIG. 12 illustrates a base station and a user equipment applicable to one embodiment of the present invention.

FIG. 12 is a diagram of a base station and a user equipment applicable to one embodiment of the present invention.

If a relay node is included in a wireless communication system, communication in a backhaul link is performed between a base station and the relay node and communication in an access link is performed between the relay node and a user equipment. Therefore, the base station or user equipment shown in the drawing can be substituted with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor. The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for transmitting control information for D2D (device-to-device) communication in a wireless communication system and device therefor are mainly described with reference to examples applied to a 3GPP LTE system, the method and device can be applied to various kinds of wireless communication systems as well as the 3GPP LTE system.

What is claimed is:

1. A method of transmitting control information for device-to-device (D2D) communication in a wireless communication system, the method performed by a D2D transmission user equipment (UE) and comprising:
receiving a resource pool configuration for the D2D communication;
wherein the resource pool configuration includes information for a plurality of resource pools, wherein the plurality of the resource pools include a first resource pool and a second resource pool, transmitting, to a D2D reception UE, a plurality of D2D control signals on each of the plurality of the resource pools, wherein each of the plurality of the D2D control signals include resource allocation information, timing advance (TA) value and granularity indicator field (GIF), and the plurality of the D2D control signals include a first D2D control signal transmitted on the first resource pool and a second D2D control signal transmitted on the second resource pool, wherein the GIF includes a configured value multiplied by the TA value, transmitting, to the D2D reception UE, a plurality of D2D data signals on the each of the plurality of the resource pools based on the resource allocation information, and wherein the first D2D control signal includes information on a first resource available for forward link data transmission from the D2D transmission UE to the D2D reception UE and information on a second resource available for reverse link data transmission from the D2D reception UE to the D2D transmission UE, wherein the reverse link data transmission is performed based on the TA value and the configured value, wherein the second D2D control signal includes information on the first resource available for the forward link data transmission, wherein the first resource pool is located before the second resource pool in a time domain, wherein based on a resource pool included in the plurality of the resource pools is located before Mth resource pool in the time domain, the configured value included in the GIF transmitted on the resource pool is greater than a specific value, wherein based on the resource pool included in the plurality of the resource pools is located after the Mth resource pool in the time domain, the configured value included in the GIF transmitted on the resource pool is less than the specific value, and wherein the M is a natural number.

2. The method of claim 1, wherein the first D2D control signal includes information indicating D2D signal transmission power of the D2D reception UE for the reverse link data transmission.

3. The method of claim 1, wherein the first D2D control signal includes a time resource pattern of transmission (T-RPT) for the first resource pool, and wherein the first resource is resource units of odd indexes indicated based on the T-RPT, and the second resource is resource units of even indexes indicated based on the T-RPT.

4. The method of claim 1, based on the resource pool included in the plurality of the resource pools is located in the Mth resource pool in the time domain, the configured value is equal to the specific value.

5. The method of claim 1, wherein the reverse link data transmission is performed based on a sum of a plurality of TA values included in the plurality of the D2D control signals.

6. A method of receiving control information for device-to-device (D2D) communication in a wireless communication system, the method performed by a D2D reception user equipment (UE) and comprising:

receiving a resource pool configuration for the D2D communication;

wherein the resource pool configuration includes information for a plurality of resource pools, wherein the plurality of the resource pools include a first resource pool and a second resource pool, receiving, from a D2D transmission UE, a plurality of D2D control signals on each of the plurality of the resource pools, wherein each of the plurality of the D2D control signals include resource allocation information, timing advance (TA) value and granularity indicator field (GIF), and the plurality of the D2D control signals include a first D2D control signal transmitted on the first resource pool and a second D2D control signal transmitted on the second resource pool, wherein the GIF includes a configured value multiplied by the TA value, receiving, from the D2D transmission UE, a plurality of D2D data signals on the each of the plurality of the resource pools based on the resource allocation information, and wherein the first D2D control signal includes information on a first resource available for forward link data transmission from the D2D transmission UE to the D2D reception UE and information on a second resource available for reverse link transmission from the D2D reception UE to the D2D transmission UE, wherein the reverse link data transmission is performed based on the TA value and the configured value, wherein the second D2D control signal includes information on the first resource available for the forward link data transmission, wherein the first resource pool is located before the second resource pool in a time domain, wherein based on a resource pool included in the plurality of the resource pools is located before Mth resource pool in the time domain, the configured value included in the GIF transmitted on the resource pool is greater than a specific value, wherein based on the resource pool included in the plurality of the resource pools is located after the Mth resource pool in the time domain, the configured value included in the GIF transmitted on the resource pool is less than the specific value, and wherein the M is a natural number.

7. The method of claim 6, wherein the first D2D control signal includes information on a plurality of predefined scheduling assignment formats and wherein the first D2D control signal includes an order indication field (OIF) for indicating a specific scheduling assignment format among the plurality of the scheduling assignment formats.

8. The method of claim 6, wherein the first D2D control signal includes power control information for the reverse link data transmission.

9. The method of claim 6, wherein the first D2D control signal includes information indicating wake-up for the forward link data transmission.

10. The method of claim 6, wherein the first D2D control signal includes information indicating channel state information (CSI) measurement at the D2D reception UE.

11. The method of claim 6, wherein the first D2D control signal further includes information for the forward link data transmission.

12. A device-to-device (D2D) transmission user equipment (UE) for transmitting control information for D2D communication in a wireless communication system, the D2D transmission UE comprising:

a transceiver; and
a processor operatively coupled to the transceiver, and configured to:
control the transceiver to receive a resource pool configuration for the D2D communication, and
wherein the resource pool configuration includes information for a plurality of resource pools, wherein the plurality of the resource pools include a first resource pool and a second resource pool,
control the transceiver to transmit, to a D2D reception UE, a plurality of D2D control signals on each of the plurality of the resource pools,
wherein each of the plurality of the D2D control signals include resource allocation information, timing advance (TA) value and granularity indicator field (GIF), and the plurality of the D2D control signals include a first D2D control signal transmitted on the first resource pool and a second D2D control signal transmitted on the second resource pool,
wherein the GIF includes a configured value multiplied by the TA value, and
transmit, to the D2D reception UE, a plurality of D2D data signals on the each of the plurality of the resource pools based on the resource allocation information, and
wherein the first D2D control signal includes information on a first resource available for forward link data transmission from the D2D transmission UE to the D2D reception UE and information on a second resource available for reverse link data transmission from the D2D reception UE to the D2D transmission UE, wherein the reverse link data transmission is performed based on the TA value and the configured value,
wherein the second D2D control signal includes information on the first resource available for the forward link data transmission,
wherein the first resource pool is located before the second resource pool in a time domain,
wherein based on a resource pool included in the plurality of the resource pools is located before Mth resource pool in the time domain, the configured value included in the GIF transmitted on the resource pool is greater than a specific value,
wherein based on the resource pool included in the plurality of the resource pools is located after the Mth resource pool in the time domain, the configured value included in the GIF transmitted on the resource pool is less than the specific value, and
wherein the M is a natural number.

13. A device-to-device (D2D) reception user equipment (UE) for receiving control information for D2D communication in a wireless communication system, the D2D reception UE comprising:

a transceiver; and
a processor operatively coupled to the transceiver, and configured to:
control the transceiver to receive a resource pool configuration for the D2D communication,
wherein the resource pool configuration includes information for a plurality of resource pools, wherein the plurality of the resource pools include a first resource pool and a second resource pool,
control the radio frequency unit to receive, from a D2D transmission UE, a plurality of D2D control signals on each of the plurality of the resource pools,
wherein each of the plurality of the D2D control signals include resource allocation information, timing advance (TA) value and granularity indicator field (GIF), and the plurality of the D2D control signals include a first D2D control signal transmitted on the first resource pool and a second D2D control signal transmitted on the second resource pool,
wherein the GIF includes a configured value multiplied by the TA value,
receive, from the D2D transmission UE, a plurality of D2D data signals on the each of the plurality of the resource pools based on the resource allocation information, and
wherein the first D2D control information includes signal on a first resource available for forward link data transmission from the D2D transmission UE to the D2D reception UE and information on a second resource available for reverse link transmission from the D2D reception UE to the D2D transmission UE, wherein the reverse link data transmission is performed based on the TA value and the configured value,
wherein the second D2D control information includes signal on the first resource available for the forward link data transmission,
wherein the first resource pool is located before the second resource pool in a time domain,
wherein based on a resource pool included in the plurality of the resource pools is located before Mth resource pool in the time domain, the configured value included in the GIF transmitted on the resource pool is greater than a specific value,
wherein based on the resource pool included in the plurality of the resource pools is located after the Mth resource pool in the time domain, the configured value included in the GIF transmitted on the resource pool is less than the specific value, and
wherein the M is a natural number.

* * * * *